United States Patent
Sekino et al.

(10) Patent No.: US 6,787,269 B2
(45) Date of Patent: Sep. 7, 2004

(54) NONAQUEOUS ELECTROLYTE AND NONAQUEOUS ELECTROLYTE SECONDARY BATTERY

(75) Inventors: Masahiro Sekino, Kawasaki (JP); Asako Satoh, Yokohama (JP); Masashi Fujiwara, Chigasaki (JP); Hiroyuki Hasebe, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 114 days.

(21) Appl. No.: 09/961,138

(22) Filed: Sep. 24, 2001

(65) Prior Publication Data

US 2002/0064712 A1 May 30, 2002

(30) Foreign Application Priority Data

Sep. 28, 2000 (JP) ....................................... 2000-296074

(51) Int. Cl.[7] .............................................. H01M 10/40
(52) U.S. Cl. ........................ 429/338; 429/330; 429/303; 252/62.2
(58) Field of Search ................................ 429/300, 303, 429/338; 252/62.2

(56) References Cited

U.S. PATENT DOCUMENTS

| | | | | |
|---|---|---|---|---|
| 5,993,997 A | * | 11/1999 | Fujimoto et al. | ......... 429/231.8 |
| 6,048,639 A | * | 4/2000 | Sonozaki et al. | ........... 429/127 |
| 6,465,134 B1 | * | 10/2002 | Shibuya et al. | ............. 429/300 |

FOREIGN PATENT DOCUMENTS

| | | | | |
|---|---|---|---|---|
| EP | 0 398 689 | | 11/1990 | |
| EP | 0 478 379 | | 4/1992 | |
| EP | 759641 | A1 * | 2/1997 | .......... H01M/10/40 |
| EP | 0 997 960 | | 5/2000 | |
| EP | 1 030 399 | | 8/2000 | |
| EP | 1 096 592 | | 5/2001 | |
| EP | 1 187 245 | | 3/2002 | |
| JP | 4-14769 | | 1/1992 | |
| JP | 11-97062 | | 4/1999 | |
| JP | 2000-235868 | | 8/2000 | |
| WO | WO 00/79632 | | 12/2000 | |

OTHER PUBLICATIONS

Patent Abstracts of Japan, JP 04–014769, Jan. 20, 1992 (abstract).

M. C. Smart, et al., Battery Conference on Applications and Advances, XP–010352824, pp. 55–60, "Electrolytes for Li–Ion Cells in Low Temperature applications", Jan. 12–15, 1999.

O. Nakagawa, et al., The Electrochemical Society of Japan, p. 1–4 and 23, "Relationships Between Polymer Electrolyte Compositions and Characteristics of Lithium–Ion Polymer Rechargeable Batteries", Apr. 4, 2000 (with partial English translation).

* cited by examiner

*Primary Examiner*—Carol Chaney
(74) *Attorney, Agent, or Firm*—Oblon, Spivak, McClelland, Maier & Neustadt, P.C.

(57) ABSTRACT

Disclosed is a nonaqueous electrolyte secondary battery, comprising a nonaqueous electrolyte containing ethylene carbonate and γ-butyrolactone, wherein, when a charge-discharge cycle test satisfying conditions (A) to (D) given below is performed under an environment of 45° C., the capacity retention rate at 100-th charge-discharge cycle is at least 85% based on the discharge capacity in the first charge-discharge cycle, (A) for the charging, the constant current-constant voltage charging to 4.2V is performed for 3 hours under a current of 1C, (B) the discharging is performed to 3V under a current of 1C, (C) after the charging, the secondary battery is left to stand for 10 minutes, followed by performing the discharging, and (D) after the discharging, the secondary battery is left to stand for 10 minutes, followed by performing the charging.

23 Claims, 2 Drawing Sheets

NONAQUEOUS ELECTROLYTE AND NONAQUEOUS ELECTROLYTE SECONDARY BATTERY

CROSS-REFERENCE TO RELATED APPLICATIONS

This application is based upon and claims the benefit of priority from the prior Japanese Patent Application No. 2000-296074, filed Sep. 28, 2000, the entire contents of which are incorporated herein by reference.

BACKGROUND OF THE INVENTION

1. Field of the Invention

The present invention relates to a nonaqueous electrolyte and a nonaqueous electrolyte secondary battery.

2. Description of the Related Art

Presently, a lithium ion secondary battery has been commercialized as a nonaqueous electrolyte secondary battery used in a portable apparatus such as a portable telephone. The lithium ion secondary battery comprises a positive electrode containing lithium cobalt oxide ($LiCoO_2$), a negative electrode containing a graphitized material or a carbonaceous material, a nonaqueous electrolyte prepared by dissolving a lithium salt in an organic solvent, and a separator formed substantially of a porous film. A nonaqueous solvent having a low viscosity and a low boiling point is used as the solvent for preparing the nonaqueous electrolyte.

It is of high importance to decrease the thickness of the secondary battery in accordance with decrease in the thickness of the portable apparatus. In order to decrease the thickness of the secondary battery, it is necessary to decrease the wall thickness of the case housing the positive electrode, the negative electrode, the separator and the nonaqueous electrolyte. However, the lithium ion secondary battery using a case having a small wall-thickness gives rise to the problem that the case is swollen and deformed if a gas is generated from the negative electrode in the stage of the initial charging or if the positive electrode reacts with the nonaqueous electrolyte during storage of the secondary battery under high temperatures not lower than 60° C. so as to decompose the nonaqueous electrolyte by oxidation and, thus, to generate a gas. If the case is deformed, the secondary battery fails to be housed in the electronic apparatus, or malfunction of the electronic apparatus is brought about.

Jpn. Pat. Appln. KOKAI No. 4-14769 discloses an organic solvent containing as a main component a mixed solvent consisting of propylene carbonate, ethylene carbonate and γ-butyrolactone. It is taught that it is possible to improve the low temperature discharge characteristics of a cylindrical nonaqueous electrolyte secondary battery by using a nonaqueous electrolyte prepared by using the mixed solvent noted above, which contains 10 to 50% by volume of γ-butyrolactone.

On the other hand, Jpn. Pat. Appln. KOKAI No. 11-97062 discloses a nonaqueous electrolyte prepared by dissolving lithium tetrafluoro borate ($LiBF_4$) in a mixed solvent containing 10% by volume of γ-butyrolactone. It is taught that the particular nonaqueous electrolyte permits suppressing the decomposition by oxidation of the positive electrode containing lithium cobalt composite oxide as an active material.

Further, a lithium ion polymer secondary battery comprising a polymer gel electrolyte is disclosed on page 23 of "Summary of Lectures for 67-th Meeting of Electrochemical Institute" published on Mar. 28, 2000. It is reported that the polymer gel electrolyte is prepared by polymerizing a mixed solution of an electrolyte and a polyfunctional acrylate monomer, followed by chemically crosslinking the resultant polymer. The electrolyte is prepared by dissolving a solute salt of $LiBF_4$ or $LiPF_6$ in a mixed solvent prepared by mixing ethylene carbonate and γ-butyrolactone in a mixing ratio by volume of 2:3.

However, the secondary battery disclosed in any of the three prior publications quoted above gives rise to the problem that, if the secondary battery is used under a high temperature environment, the negative electrode reacts with the nonaqueous electrolyte so as to bring about decomposition of the nonaqueous electrolyte by reduction, resulting in failure to obtain a long cycle life.

Still further, Jpn. Pat. Appln. KOKAI No. 2000-235868 is directed to a nonaqueous electrolyte secondary battery using a nonaqueous electrolyte comprising a nonaqueous solvent and a lithium salt dissolved in the nonaqueous solvent. It is taught that the nonaqueous electrolyte comprises 50 and 95% by volume of γ-butyrolactone based on the total amount of the nonaqueous solvent, ethylene carbonate, and at least one kind of a third solvent selected from the group consisting of propylene carbonate, vinylene carbonate, trifluoropropylene, diethyl carbonate, methyl ethyl carbonate and an aromatic compound.

However, the secondary battery comprising the nonaqueous electrolyte containing the nonaqueous solvent of the composition pointed out above gives rise to the problem that it is impossible to obtain a long cycle life under a high temperature environment.

BRIEF SUMMARY OF THE INVENTION

An object of the present invention is to provide a nonaqueous electrolyte capable of improving the charge-discharge cycle characteristics under high temperatures and a nonaqueous electrolyte secondary battery comprising the particular nonaqueous electrolyte.

According to a first aspect of the present invention, there is provided a nonaqueous electrolyte, comprising:

a nonaqueous solvent containing ethylene carbonate (EC), γ-butyrolactone (BL), and at least one selected from the group consisting of ethylene sulfite, phenylethylene carbonate, 2-methylfuran, furan, thiophene, catechol carbonate and vinylethylene carbonate, as a third solvent the EC content falling within a range of 20 to 50% by volume based on the total amount of the EC and the BL, and the BL content falling within a range of 40 to 80% by volume based on the total amount of the EC and the BL; and a solute dissolved in the nonaqueous solvent.

According to a second aspect of the present invention, there is provided a nonaqueous electrolyte secondary battery, comprising:

a case having a wall thickness not larger than 0.3 mm;

a positive electrode provided in the case;

a negative electrode provided in the case; and a nonaqueous electrolyte provided in the case and comprising a nonaqueous solvent containing ethylene carbonate and γ-butyrolactone and a solute dissolved in the nonaqueous solvent, wherein, when a charge-discharge cycle test satisfying conditions (A) to (D) given below is performed under an environment of 45° C., the capacity retention rate at 100-th charge-discharge cycle is at least 85% based on the discharge capacity in the first charge-discharge cycle:

(A) for the charging, the constant current-constant voltage charging to 4.2V is performed for 3 hours under a current of 1 C;

(B) the discharging is performed to 3V under a current of 1 C;

(C) after the charging, the secondary battery is left to stand for 10 minutes, followed by performing the discharging; and (D) after the discharging, the secondary battery is left to stand for 10 minutes, followed by performing the charging.

According to a third aspect of the present invention, there is provided a nonaqueous electrolyte secondary battery, comprising:

a case having a wall thickness not larger than 0.3 mm;
a positive electrode provided in the case;
a negative electrode provided in the case; and
a nonaqueous electrolyte which is provided in the case and comprises a nonaqueous solvent and a solute dissolved in the nonaqueous solvent, the nonaqueous solvent containing ethylene carbonate (EC), γ-butyrolactone (BL), and at least one selected from the group consisting of ethylene sulfite, phenylethylene carbonate, 2-methylfuran, furan, thiophene, catechol carbonate and vinylethylene carbonate as a third solvent, the EC content falling within a range of 20 to 50% by volume based on the total amount of the EC and the BL, and the BL content falling within a range of 40 to 80% by volume based on the total amount of the EC and the BL.

Further, according to a fourth aspect of the present invention, there is provided a nonaqueous electrolyte secondary battery, comprising:

a case having a wall thickness not larger than 0.3 mm;
a positive electrode provided in the case;
a negative electrode provided in the case; and
a nonaqueous electrolyte layer which is arranged between the positive electrode and negative electrode and comprises a nonaqueous electrolyte and a polymer for gelling the nonaqueous electrolyte, the nonaqueous electrolyte comprising a nonaqueous solvent containing ethylene carbonate (EC), γ-butyrolactone (BL), and at least one selected from the group consisting of ethylene sulfite, phenylethylene carbonate, 2-methylfuran, furan, thiophene, catechol carbonate and vinylethylene carbonate, as a third solvent the EC content falling withing a range of 20 to 50% by volume based on the total amount of the EC and the BL, and the BL content falling within a range of 40 to 80% by volume based on the total amount of the EC and the BL.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawing, which are incorporated in and constitute a part of the specification, illustrate embodiments of the present invention, and together with the general description given above and the detailed description of the embodiments given below, serve to explain the principles of the present invention.

DETAILED DESCRIPTION OF THE INVENTION

The present invention provides a nonaqueous electrolyte secondary battery comprising a case having a wall thickness not larger than 0.3 mm, an electrode group housed in the case, and a nonaqueous electrode held by the electrode group and comprising a nonaqueous solvent and a lithium salt dissolved in the nonaqueous solvent.

The nonaqueous solvent used in the present invention comprises (a) a mixed solvent comprising 20 to 50% by volume of ethylene carbonate and 40 to 80% by volume of γ-butyrolactone, and (b) a third solvent consisting of at least one solvent selected from the group consisting of ethylene sulfite, phenylethylene carbonate, 2-methylfuran, furan, thiophene, catechol carbonate, and vinylethylene carbonate.

As the nonaqueous electrolyte, it is possible to use, for example, a liquid nonaqueous electrolyte consisting essentially of the nonaqueous solvent noted above and the lithium salt noted above, a nonaqueous electrolyte layer containing the nonaqueous solvent and the lithium salt, and a gel-like nonaqueous electrolyte containing the nonaqueous solvent, the lithium salt and a polymer. Incidentally, the electrode group holding the gel-like nonaqueous electrolyte can be prepared by, for example, (I) impregnating a separator with a slurry containing the nonaqueous solvent, the lithium salt, and a gelling agent, followed by interposing the separator between the positive electrode and the negative electrode, or (II) by coating the positive electrode or the negative electrode with a slurry containing the nonaqueous solvent, the lithium salt and the gelling agent, followed by interposing the separator between the positive electrode and the negative electrode. The gelling agent used in the present invention includes, for example, polyacrylonitrile (PAN). Particularly, it is desirable to use a liquid nonaqueous electrolyte. In the case of using a liquid nonaqueous electrolyte, it is possible to increase the ionic conductance so as to make it possible to decrease the interface resistance between the positive electrode and the separator and the interface resistance between the negative electrode and the separator.

Examples of the secondary batteries of the present invention, i.e., a first nonaqueous electrolyte secondary battery and a second nonaqueous electrolyte secondary battery, will now be described.

1. First Nonaqueous Electrolyte Secondary Battery

The first nonaqueous electrolyte secondary battery comprises a case formed essentially of a sheet material having a thickness not larger than 0.3 mm, an electrode group housed in the case and including a positive electrode capable of absorbing-desorbing lithium ions, a negative electrode capable of absorbing-desorbing lithium ions and a separator arranged between the positive and negative electrodes, a liquid nonaqueous electrolyte comprising a nonaqueous solvent and a solute dissolved in the nonaqueous solvent.

The electrode group, the positive electrode, the negative electrode, the separator, the nonaqueous electrolyte and the case will now be described in detail.

1) Electrode Group

In the electrode group, it is desirable for the positive electrode, the negative electrode and the separator to be made integral. The particular electrode group can be prepared by, for example, methods (i) or (ii) described below.

(i) A laminate structure comprising a positive electrode, a negative electrode and a separator interposed between the positive and negative electrodes is wound in a flat shape so as to prepare a flat laminate structure, or the laminate structure noted above is spirally wound, followed by compressing the wound laminate structure in the radial direction so as to prepare a flat laminate structure. Alternatively, the particular laminate structure is folded at least once so as to prepare a flat laminate structure. Then, a thermal molding is applied to the resultant flat laminate structure in the direction of the lamination so as to thermally cure the binder contained in the positive electrode and the negative electrode, thereby making the positive electrode, the negative electrode and the separator integral and, thus, obtaining a desired electrode group.

The thermal molding can be applied either before or after the flat laminate structure is housed in the case. Also, it is desirable for the thermal molding to be performed under a reduced pressure atmosphere including vacuum or an atmosphere of the atmospheric pressure.

The molding can be performed by, for example, a press molding or by the loading in a molding mold.

It is desirable for the thermal molding to be carried out under temperatures falling within a range of between 20° C. and 120° C., more desirably, between 60° C. and 100° C. It is also desirable for the thermal molding to be carried out under the pressure falling within a range of between 0.01 and 35 kg/cm$^2$, more desirably, between 8 and 30 kg/cm$^2$, most desirably, between 12 and 25 kg/cm$^2$.

(ii) A laminate structure comprising a positive electrode, a negative electrode and a separator interposed between the positive and negative electrodes is wound in a flat shape, or the laminate structure noted above is spirally wound, followed by compressing the wound laminate structure in the radial direction so as to obtain a flat laminate structure. Alternatively, the particular laminate structure is folded at least once so as to obtain a flat laminate structure. The flat laminate structure thus prepared is impregnated with a solution of a polymer having an adhesivity, followed by applying a vacuum drying so as to evaporate the solvent of the solution. Then, a thermal forming is applied so as to make the positive electrode, the negative electrode and the separator integral, thereby obtaining an electrode group. In the electrode group thus obtained, the positive electrode and the separator are made integral by the polymer dotted inside the positive electrode and the separator and in the boundary between the positive electrode and the separator. Likewise, the negative electrode and the separator are made integral by the polymer dotted inside the negative electrode and the separator and at the boundary between the negative electrode and the separator. It follows that it is possible to increase the bonding strength of the electrodes while suppressing the internal resistance of the secondary battery.

It is possible for the thermal forming to be carried out either before or after the flat laminate structure of the electrode group is housed in the case.

The solution of a polymer having an adhesivity can be prepared by dissolving an adhesive polymer in an organic solvent.

It is desirable for the polymer having an adhesivity to be capable of maintaining a high adhesivity under the state that the nonaqueous electrolyte is held by the electrode group. It is more desirable for the adhesive polymer to have a high lithium ionic conductance. The specific adhesive polymers used in the present invention include, for example, polyacrylonitrile (PAN), polyacrylate (PMMA), polyvinylidene fluoride (PVdF), polyvinylidene chloride (PVC), and polyethylene oxide (PEO). Particularly, it is desirable to use polyvinylidene fluoride as the adhesive polymer. It should be noted that polyvinylidene fluoride is capable of holding the nonaqueous electrolyte. Also, if allowed to contain the nonaqueous electrolyte, polyvinylidene fluoride is partly gelled so as to further improve the ionic conductance.

It is desirable for the solvent used in the present invention to have a boiling point not higher than 200° C., more desirably, not higher than 180° C. On the other hand, it is desirable for the lower limit of the boiling point of the solvent to be 50° C., more desirably 100° C.

It is desirable for the concentration of the adhesive polymer in the solution to fall within a range of between 0.05 and 2.5% by weight, more desirably between 0.1 and 1.5% by weight.

Where the concentration of the adhesive polymer in the solution falls within a range of between 0.05 and 2.5% by weight, it is desirable for the pouring amount of the solution to fall within a range of between 0.1 and 2 ml per 100 mAh of the battery capacity, more desirably between 0.15 and 1 ml per 100 mAh of the battery capacity.

It is desirable for the vacuum drying to be carried out under temperatures not higher than 100° C., more desirably within a range of between 40° C. and 100° C.

Further, it is desirable for the total amount of the adhesive polymer contained in the secondary battery to fall within a range of between 0.1 and 6 mg per 100 mAh of the battery capacity, more desirably within a range of between 0.2 and 1 mg per 100 mAh of the battery capacity.

2) Positive Electrode

The positive electrode comprises a current collector and a positive electrode layer containing an active material, the positive electrode layer being formed on one surface or both surfaces of the current collector.

The positive electrode layer contains a positive electrode active material, a binder and a conducting agent.

The positive electrode active material used in the present invention includes, for example, various oxides such as manganese dioxide, lithium manganese composite oxide, a lithium-containing nickel oxide, a lithium-containing cobalt oxide, a lithium-containing nickel cobalt oxide, a lithium-containing iron oxide, and a lithium-containing vanadium oxide; and chalcogen compounds such as titanium disulfide and molybdenum disulfide. Particularly, it is desirable to use as the positive electrode active material a lithium-containing cobalt oxide (e.g., $LiCoO_2$), a lithium-containing nickel cobalt oxide (e.g., $LiNi_{0.8}CO_{0.2}O_2$), and a lithium manganese complex oxide (e.g., $LiMn_2O_4$ or $LiMnO_2$) because the use of the particular positive electrode active material makes it possible to obtain a high voltage.

The conducting agent used in the present invention includes, for example, acetylene black, carbon black and graphite.

The binder used in the present invention can perform the functions of allowing the current collector to hold the active material and of joining the active material particles. The specific materials used as the binder include, for example, polytetrafluoro ethylene (PTFE), polyvinylidene fluoride (PVdF), an ethylene-propylene-diene copolymer (EPDM), and styrene-butadiene rubber (SBR).

It is desirable for the mixing amount of the positive electrode active material to fall within a range of between 80 and 95% by weight, for the mixing amount of the conducting agent to fall within a range of 3% by weight and 20% by weight, and for the mixing amount of the binder to fall within a range of between 2% by weight and 7% by weight.

A conductive substrate of a porous structure or a conductive substrate of a nonporous structure can be used in the present invention as the current collector. It is possible to use, for example, aluminum, stainless steel or nickel for forming these conductive substrates. Particularly, it is desirable to use as the current collector a conductive substrate of a two dimensional porous structure having at least one pore having a diameter not larger than 3 mm per 10 cm$^2$ of the conductive substrate. It is more desirable for the diameter of the pore to fall within a range of between 0.1 mm and 1 mm. Also, it is more desirable for 10 to 20 pores to be present per 10 cm$^2$ of the conductive substrate.

It is desirable for the conductive substrate having a two dimensional porous structure, which has at least one pore having a diameter not larger than 3 mm per 10 cm$^2$ of the conductive substrate, to have a thickness falling within a range of between 15 $\mu$m and 100 $\mu$m, more desirably between 30 $\mu$m and 80 $\mu$m.

The positive electrode is prepared by, for example, suspending the positive electrode active material, the conducting agent and the binder in a suitable solvent, followed by coating the current collector with the suspension and subsequently drying and pressing the current collector coated with the suspension into a thin plate.

Where the electrode group is prepared by method (ii) described above, the positive electrode further contains a polymer having an adhesivity.

3) Negative Electrode

The negative electrode comprises a current collector and a negative electrode layer formed on one surface or both surfaces of the current collector. Also, the negative electrode layer contains a carbonaceous material capable of absorbing-desorbing lithium ions and a binder.

The carbonaceous material used in the present invention includes, for example, a graphitized material and carbonaceous material such as graphite, coke, carbon fiber and spherical carbon; or a graphitized material and carbonaceous material obtained by heat-treating a thermosetting resin, isotropic pitch, mesophase pitch, mesophase pitch-based carbon fibers, vapor-grown-carbon fiber or mesophase globules at a temperature of 500 to 3,000° C., the mesophase pitch based carbon fiber being particularly desirable because the capacity and the charge-discharge cycle characteristics can be improved. Particularly, it is desirable use a graphitized material obtained by setting the temperature for the heat treatment at 2,000° C. or more and having an average layer spacing $d_{002}$ derived from (002) reflection of 0.34 nm or less. The battery capacity and the large current discharge characteristics can be markedly improved in the nonaqueous electrolyte secondary battery comprising the negative electrode containing the particular graphitized material as the carbonaceous material. It is more desirable for the average layer spacing $d_{002}$ to be not larger than 0.336 nm.

The binder used in the present invention includes, for example, polytetrafluoro ethylene (PTFE), polyvinylidene fluoride (PVdF), ethylene-propylene-diene copolymer (EPDM), styrene-butadiene rubber (SBR) and carboxymethyl cellulose (CMC).

It is desirable for the mixing amount of the carbonaceous material to fall within a range of between 80 and 98% by weight, and for the mixing amount of the binder to fall within a range of between 2 and 20% by weight.

A conductive substrate of a porous structure or a conductive substrate of a nonporous structure can be used in the present invention as the current collector included in the negative electrode. It is possible to use, for example, copper, stainless steel or nickel for forming these conductive substrates. Particularly, it is desirable to use as the current collector a conductive substrate of a two dimensional porous structure having at least one pore having a diameter not larger than 3 mm per 10 cm$^2$ of the conductive substrate. It is more desirable for the diameter of the pore to fall within a range of between 0.1 mm and 1 mm. Also, it is more desirable for 10 to 20 pores to be present per 10 cm$^2$ of the conductive substrate.

It is desirable for the conductive substrate having a two dimensional porous structure, which has at least one pore having a diameter not larger than 3 mm per 10 cm$^2$ of the conductive substrate, to have a thickness falling within a range of between 10 $\mu$m and 50 $\mu$m.

The negative electrode is prepared by, for example, kneading a carbonaceous material capable of absorbing-desorbing lithium ions and the binder in the presence of a solvent, followed by coating a current collector with the kneaded material, followed by drying the current collector coated with the kneaded material and subsequently pressing the current collector coated with the kneaded material once or 2 to 5 times.

Where the electrode group is prepare by method (ii) described previously, the negative electrode further contains a polymer having an adhesivity.

The negative electrode layer contains a carbonaceous material capable of absorbing-desorbing lithium ions as described previously. Alternatively, it is possible for the negative electrode layer to contain a metal such as aluminum, magnesium, tin or silicon, a metal compound such as a metal oxide, a metal sulfide or a metal nitride, or a lithium alloy.

The metal oxide noted above includes, for example, tin oxide, silicon oxide, lithium titanium oxide, niobium oxide, and tungsten oxide. The metal sulfide noted above includes, for example, tin sulfide and titanium sulfide. The metal nitride noted above includes, for example, lithium cobalt nitride, lithium iron nitride and lithium manganese nitride. Further, the lithium alloy noted above includes, for example, a lithium-aluminum alloy, a lithium-tin alloy, a lithium-lead alloy, and a lithium-silicon alloy.

4) Separator

The separator is formed essentially of a porous sheet. The porous sheet used as the separator includes, for example, a porous film and an unwoven fabric. It is desirable for the porous sheet to contain at least one material selected from the group consisting of polyolefin and cellulose. The polyolefin noted above includes, for example, polyethylene and polypropylene. Particularly, it is desirable to use a porous film containing polyethylene, polypropylene or both polyethylene and polypropylene as the separator because the particular separator permits improving the safety of the secondary battery.

It is desirable for the thickness of the porous sheet to be not larger than 30 $\mu$m, more desirably, not larger than 25 $\mu$m. On the other hand, it is desirable for the lower limit in the thickness of the porous sheet to be 5 $\mu$m, more desirably, to be 8 $\mu$m.

It is desirable for the thermal shrinkage of the porous sheet at 120° C. for 1 hour to be 20% or less, more desirably, to be 15% or less.

It is desirable for the porosity of the porous sheet to fall within a range of between 30% and 60%, more desirably, between 35% and 50%.

Further, it is desirable for the air permeability of the porous sheet to be set at 600 seconds/100 cm$^3$ or less. The air permeability denotes the time (second) required for 100 cm³ of the air to pass through the porous sheet. It is more desirable to set the upper limit of the air permeability at 500 seconds/100 cm³. Also, it is desirable to set the lower limit of the air permeability at 50 seconds/100 cm³, more desirably, at 80 seconds/100 cm³.

Incidentally, where the electrode group is prepared by method (ii) described previously, the separator further contains a polymer having an adhesivity.

5) Liquid Nonaqueous Electrolyte

The liquid nonaqueous electrolyte comprises a nonaqueous solvent and a solute dissolved in the nonaqueous electrolyte.

The nonaqueous solvent used in the present invention comprises a mixed solvent comprising 20 to 50% by volume of ethylene carbonate and 40 to 80% by volume of γ-butyrolactone, and a third solvent consisting essentially of at least one solvent selected from the group consisting of ethylene sulfite (ES), phenylethylene carbonate (phEC), 2-methylfuran (2Me-F), furan (F), thiophene (TIOP), catechol carbonate (CATC), and vinylethylene carbonate (VEC).

Each of these solvents will now be described.

a. γ-butyrolactone (BL)

The nonaqueous solvent used in the present invention comprises γ-butyrolactone (BL) and ethylene carbonate (EC). The EC is contained in an amount of 20 to 50% by volume relative to 100% by volume of the total amount of the EC and the BL. The BL is contained in an amount of 40 to 80% by volume relative to 100% by volume of the total amount of the EC and the BL. If the mixing amount of BL is smaller than 40% by volume, a gas tends to be generated from the nonaqueous solvent under high temperatures. Also, since the mixed solvent also contains a cyclic carbonate such as ethylene carbonate as another solvent, the mixing amount of the cyclic carbonate is rendered relatively high, if the mixing amount of BL is smaller than 40% by volume, with the result that the viscosity of the solvent is rendered markedly high. It follows that the conductivity and the permeability of the nonaqueous electrolyte are markedly lowered so as to lower the charge-discharge cycle characteristics and the discharge characteristics under a low temperature environment of about −20° C. On the other hand, if the mixing amount of BL exceeds 80% by volume, the reaction between the negative electrode and BL takes place so as to lower the charge-discharge cycle characteristics. To be more specific, if the negative electrode containing, for example, a carbonaceous material capable of absorbing-desorbing lithium ions reacts with BL so as to decompose the nonaqueous electrolyte by reduction, a film inhibiting the charge-discharge reaction is formed on the surface of the negative electrode. As a result, a current concentration tends to take place in the negative electrode so as to precipitate the lithium metal on the surface of the negative electrode or to increase the impedance at the interface of the negative electrode. It follows that the charge-discharge efficiency of the negative electrode is lowered so as to lower the charge-discharge cycle characteristics. It is more desirable for the mixing amount of BL to fall within a range of between 35% by volume and 75% by volume, and furthermore desirably between 55% by volume and 75% by volume relative to 100% by volume of the total amount of the EC and the BL.

b. Ethylene Carbonate (EC)

As described above, the nonaqueous solvent used in the present invention comprises ethylene carbonate (EC) and γ-butyrolactone (BL). The EC content of the mixed solvent consisting essentially of the EC and the BL is 20 to 50% by volume. The BL content of the mixed solvent consisting essentially of the EC and the BL is 40 to 80% by volume. If the mixing amount of EC is smaller than 20% by volume, it is difficult for the surface of the negative electrode to be covered with a protective film, with the result that the reaction between the negative electrode and BL proceeds so as to make it difficult to improve sufficiently the charge-discharge cycle characteristics. On the other hand, if the mixing amount of EC exceeds 50% by volume, the viscosity of the nonaqueous electrolyte is increased so as to lower the ionic conductance. As a result, it is difficult to improve sufficiently the charge-discharge cycle characteristics and the discharge characteristics under low temperatures. It is more desirable for the mixing amount of EC to fall within a range of between 20% by volume and 40% by volume and, furthermore desirably between 20% by volume and 35% by volume relative to 100% by volume of the total amount of the EC and the BL.

c. Third Solvent

As described previously, the nonaqueous solvent used in the present invention comprises the mixed solvent noted above and a third solvent. It is possible for the nonaqueous solvent to contain a single or a plurality of third solvents.

The third solvent serves to increase the density of the protective film formed on the surface of the negative electrode so as to lower the impedance at the interface of the negative electrode. It is desirable for the mixing amount of the third solvent to be not larger than 5% by weight based on the total amount of the nonaqueous solvent. If the mixing amount of the third solvent based on the total amount of the nonaqueous solvent exceeds 5% by weight, it is difficult to suppress sufficiently the decomposition by oxidation of the nonaqueous electrolyte under high temperatures, with the result that the case tends to be swollen. At the same time, it is difficult to obtain a high discharge capacity under a high temperature environment. On the other hand, it is desirable for the lower limit of the mixing amount of the third solvent to be set at 0.01% by weight. If the lower limit of the mixing amount of the third solvent is lower than 0.01% by weight, the protective film on the surface of the negative electrode fails to be densified, with the result that it is difficult to obtain a long life of the secondary battery under a high temperature environment.

It should be noted that the third solvent migrates from the nonaqueous electrolyte onto the surface of the negative electrode during the initial charge-discharge process so as to be attached to the surface of the negative electrode. It follows that, in the nonaqueous solvent present in the secondary battery after the initial charge-discharge process, the mixing ratio of the third solvent based on the total nonaqueous solvent is lowered, compared with the state before assembly of the secondary battery.

Particularly, where at least one material selected from the group consisting of phenylethylene carbonate, 2-methylfuran, furan, thiophene, catechol carbonate and vinylethylene carbonate is used as the third solvent, it is desirable for the mixing amount of the third solvent to be not larger than 3% by weight based on the total amount of the nonaqueous solvent in order to improve the discharge capacity and the cycle life under high temperatures. In this case, it is desirable for the lower limit of the mixing amount of the third solvent to be set at 0.01% by weight.

On the other hand, where at least one material selected from the group consisting of 2-methylfuran, furan, thiophene, and catechol carbonate is used as the third solvent, it is desirable for the mixing amount of the third solvent to be not larger than 1.5% by weight based on the total amount of the nonaqueous solvent in order to improve the discharge capacity and the cycle life under high temperatures. In this case, it is desirable for the lower limit of the mixing amount of the third solvent to be set at 0.1% by weight.

Also, where ethylene sulfite is used as the third solvent, it is desirable for the mixing amount of the third solvent to be not larger than 2% by weight, more desirably, not larger than 1% by weight, based on the total amount of the nonaqueous solvent in order to improve the discharge capacity and the cycle life under high temperatures. It is more desirable for the mixing amount of the third solvent based on the total amount of the nonaqueous solvent to fall within a range of between 0.05% by weight and 2% by weight, and, furthermore desirably, between 0.1% by weight and 1% by weight.

Further, where at least one material selected from the group consisting of phenylethylene carbonate and vinylethylene carbonate is used as the third solvent, it is desirable for the mixing amount of the third solvent based on the total amount of the nonaqueous solvent to be not larger than 3% by weight in order to improve the discharge capacity and the cycle life under high temperatures. It is more desirable for the mixing amount of the third solvent in this case to fall within a range of between 0.2% by weight and 3% by weight, and, furthermore desirably, between 0.3% by weight and 3% by weight.

Among the third solvent materials enumerated previously, it is desirable to use ethylene sulfite, catechol carbonate, vinylethylene carbonate and phenylethylene carbonate. It is possible to improve the cycle life of the secondary battery under room temperature by using as the third solvent at least one solvent selected from the group consisting of ethylene sulfite, catechol carbonate, vinylethylene carbonate and phenylethylene carbonate. Particularly, it is possible to improve the cycle life of the secondary battery under room temperature and, at the same time, to further suppress the gas generation amount in the initial charging step and during the storage of the secondary battery under high temperatures by using as the third solvent at least one solvent selected from the group consisting of catechol carbonate, vinylethylene carbonate and phenylethylene carbonate.

It is desirable to use a lithium salt as the solute. The lithium salt used in the present invention includes, for example, lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro meta-sulfonate ($LiCF_3SO_3$), bis-trifluoromethyl sulfonyl imide lithium [($LiN(CF_3SO_2)_2$)], and $LiN(C_2F_5SO_2)_2$. It is possible to use a single or a plurality of solutes. Particularly, it is desirable to use $LiPF_6$ or $LiBF_4$ as the solute, and the most desirable lithium salt used as the solute is $LiBF_4$. Also, in the case of using a mixed salt comprising at least one of $Li(CF_3SO_2)_2$ and $LiN(C_2F_5SO_2)_2$ and at least one of $LiBF_4$ and $LiPF_6$, it is possible to further improve the cycle life under high temperatures.

It is desirable for the dissolving amount of the lithium salt in the nonaqueous solvent to fall within a range of between 0.5 and 2.5 mol/L, more desirably between 1 and 2.5 mol/L. Also, it is desirable for the amount of the liquid nonaqueous electrolyte to fall within a range of between 0.25 and 0.7 g per 100 mAh of the battery unit capacity, more desirably between 0.3 and 0.55 g/100 mAh.

6) Case

The case is formed essentially of a sheet material having a thickness of 0.3 mm or less. The sheet material includes, for example, a metal plate, a metal film, and a sheet containing a resin layer. Incidentally, the thickness of the sheet, the film such as the metal film and the metal plate used for forming the case is also called the wall thickness of the case.

It is possible to use, for example, polyethylene or polypropylene for forming the resin layer contained in the sheet material. It is desirable for the sheet material to include a metal layer and a protective layer formed integral with the metal layer on both surfaces of the metal layer. The metal layer noted above plays the role of shielding water. The metal layer can be formed of, for example, aluminum, stainless steel, iron, copper and nickel. Particularly, it is desirable to use aluminum for forming the metal layer because aluminum is lightweight and has a high function of shielding water. It is possible for the metal layer to be formed of a single kind of metal or to be formed by making integral a plurality of different kinds of metal layers. As described above, the protective layer is formed on each surface of the metal layer. The protective layer in contact with the outside plays the role of preventing a damage done to the metal layer. The outside protective layer is formed of a single kind of a resin layer or a plurality of resin layers. On the other hand, the inside protective layer plays the role of preventing the metal layer from being corroded by the nonaqueous electrolyte. The inside protective layer is formed of a single kind a resin layer or a plurality of different kinds of resin layers. Also, it is possible to use a thermoplastic resin layer for forming the surface of the inside protective layer, i.e., the inner surface of the case.

It is possible to use, for example, iron, stainless steel, or aluminum for forming the metal plate or the metal film noted above.

As described above, the case is formed essentially of a sheet material having a thickness not larger than 0.3 mm. If the wall thickness of the case exceeds 0.3 mm, it is difficult to obtain a high weight energy density and a high volume energy density of the secondary battery. It is desirable for the wall thickness of the case not to exceed 0.25 mm, more desirably, not to exceed 0.15 mm, and most desirably not to exceed 0.12 mm. On the other hand, if the wall thickness of the case is smaller than 0.05 mm, the case tends to be deformed and broken. Naturally, it is desirable for the lower limit in the wall thickness of the case to be set at 0.05 mm.

The wall thickness of the case is measured as follows. Specifically, 3 points apart from each other by at least 1 cm are optionally selected in the region excluding the sealing region of the sheet material forming the case, and the thickness of the sheet material at each of these 3 points is measured. Then, the average value of the thicknesses of these 3 points is calculated and the average value thus calculated is regarded as the wall thickness of the case. Incidentally, where a foreign matter, e.g., a resin, is attached to the surface of the sheet material forming the case, the thickness of the sheet material forming the case is measured after the foreign matter is removed. For example, where PVdF is attached to the surface of the sheet material forming the case, the PVdF is removed by wiping the surface of the sheet material forming the case with dimethyl formamide, followed by measuring the thickness of the sheet material forming the case.

It is desirable for an adhesive layer to be formed in at least a part of the surface of the sheet material forming the case such that the adhesive layer permits the electrode group to be bonded to the inner surface of the case. In the case of the particular construction, it is possible to fix the case to the surface of the electrode group, with the result that the electrolyte is prevented from permeating the clearance between the electrode group and the case.

It is desirable to apply an initial charging to the secondary battery with a current falling within a range of between 0.05 C and 0.8 C under temperatures falling within a range of between 15° C. and 80° C. The charging under these conditions may be applied for one cycle or a plurality of cycles. Also, it is possible to store the secondary battery for 1 to 20 hours under temperatures falling within a range of between 15° C. and 80° C. prior to the initial charging.

As described above, the initial charging is preferably applied under temperatures falling within a range of between 15° C. and 80° C. If the initial charging is performed under temperatures lower than 15° C., it is difficult to permit the positive electrode, the negative electrode and the separator to be impregnated uniformly with the liquid nonaqueous electrolyte because the liquid nonaqueous electrolyte has a high viscosity under temperatures lower than 15° C. It follows that the internal impedance of the secondary battery is increased so as to lower the utilization rate of the active materials. On the other hand, if the initial charging is performed under temperatures exceeding 80° C., the binder contained in the positive electrode and the negative electrode is deteriorate. It is more desirable for the initial charging to be performed under temperatures falling within a range of between 15° C. and 60° C., and furthermore desirably, between 20° C. and 60° C.

Also, the initial charging is desirably performed with the charging current set to fall within a range of between 0.05 and 0.8 C, as described above. In this case, it is possible to retard reasonably the swelling of the positive electrode and the negative electrode caused by the charging, with the result that it is possible for the liquid nonaqueous electrolyte to be permeated uniformly into the positive electrode and the negative electrode.

By the process described above, the voids of the positive and negative electrodes and the separator are impregnated uniformly with the liquid nonaqueous electrolyte so as to diminish the internal impedance of the secondary battery. As a result, the utilization rate of the active materials can be increased so as to increase the substantial battery capacity. It is also possible to improve the charge-discharge cycle characteristics and the large current discharge characteristics of the secondary battery.

A thin type lithium ion secondary battery exemplifying one example of the first nonaqueous electrolyte secondary battery of the present invention will now be described with reference to FIGS. 1 and 2.

Figure 1:
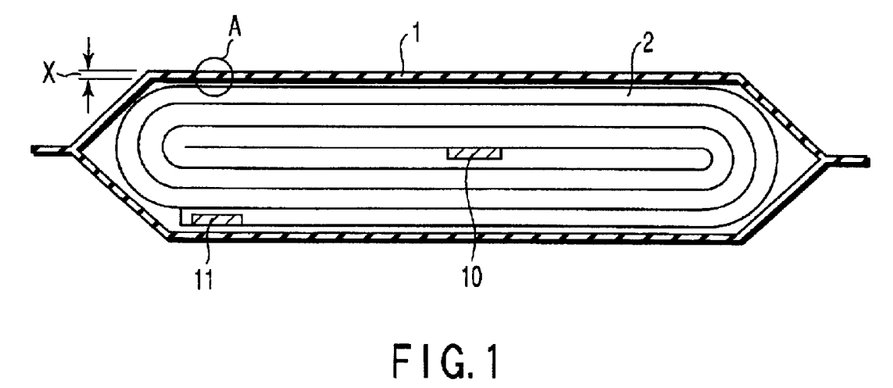
FIG. 1 is a cross sectional view showing a thin type lithium ion secondary battery exemplifying one example of a first nonaqueous electrolyte secondary battery of the present invention.
Figure 2:
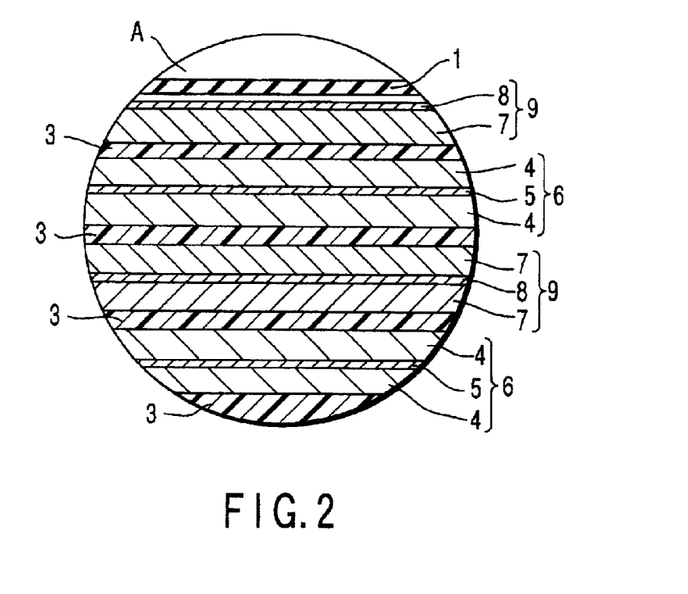
FIG. 2 is a cross sectional view showing in a magnified fashion portion A shown in FIG. 1.

FIG. 1 is a cross sectional view showing a thin type lithium ion secondary battery exemplifying one example of the first nonaqueous electrolyte secondary battery of the present invention, and FIG. 2 is a cross sectional view showing in a magnified fashion portion A shown in FIG. 1.

As shown in FIG. 1, an electrode group 2 is housed in a case 1 formed substantially of a sheet material having a wall thickness X not larger than 0.3 mm. The electrode group 2 is prepared by winding in a flat shape a laminate structure comprising a positive electrode, a separator and a negative electrode. As shown in FIG. 2, the laminate structure comprises a separator 3; a positive electrode 6 including a positive electrode layer 4, a positive electrode current collector 5 and a positive electrode layer 4; a separator 3; a negative electrode 9 including a negative electrode layer 7, a negative electrode current collector 8 and a negative electrode layer 7; a separator 3; a positive electrode 6 including a positive electrode layer 4, a positive electrode current collector 5 and a positive electrode layer 4; a separator 3; and a negative electrode 9 including a negative electrode layer 7 and a negative electrode current collector 8, which are laminated in the order mentioned as viewed from the lower side in the drawing. The negative electrode current collector 8 constitutes the outermost layer of the electrode group 2. One end of a band-like positive electrode lead 10 is connected to the positive electrode current collector 5 of the electrode group 2, and the other end portion of the band-like positive electrode lead 10 extends to the outside from within the case 1. On the other hand, one end of a band-like negative electrode lead 11 is connected to the negative electrode current collector 8 of the electrode group 2, and the other end portion of the band-like negative electrode lead 11 extends to the outside from within the case 1.

A second nonaqueous electrolyte secondary battery of the present invention will now be described.

The second nonaqueous electrolyte secondary battery of the present invention comprises a case formed essentially of a sheet material having thickness not exceeding 0.3 mm and an electrode group housed in the case. The electrode group includes a positive electrode capable of absorbing-desorbing lithium ions, a negative electrode capable of absorbing-desorbing lithium ions, and a nonaqueous electrolyte layer arranged between the positive electrode and the negative electrode and including a nonaqueous solvent and a solute dissolved in the nonaqueous electrolyte.

The nonaqueous solvent contains a mixed solvent comprising 20 to 50% by volume of ethylene carbonate and 40 to 80% by volume of γ-butyrolactone relative to 100% by volume of the mixed solvent, and a third solvent consisting essentially of at least one solvent selected from the group consisting of ethylene sulfite, phenylethylene carbonate, 2-methylfuran, furan, thiophene, catechol carbonate, and vinylethylene carbonate.

The case, the positive electrode and the negative electrode used in the second nonaqueous electrolyte secondary battery of the present invention are equal to those described previously in conjunction with the first nonaqueous electrolyte secondary battery.

The nonaqueous electrolyte layer is not simply impregnated with a nonaqueous solution prepared by dissolving the lithium salt in the nonaqueous solvent. In other words, the nonaqueous solution is contained in the nonaqueous electrolyte layer as one of the components constituting the nonaqueous electrolyte layer.

The nonaqueous electrolyte layer is prepared, for example, as follows. In the first step, a paste prepared by mixing a polymer, a nonaqueous solvent and a lithium salt is formed into a film, followed by drying the film so as to obtain a precursor of a nonaqueous electrolyte layer. Then, an electrode group is prepared by interposing the nonaqueous electrolyte layer precursor between the positive electrode and the negative electrode. Further, the electrode group thus prepared is impregnated with a liquid nonaqueous electrolyte prepared by dissolving the lithium salt in a nonaqueous solvent, followed by plasticizing the precursor under a reduced pressure so as to obtain the nonaqueous electrolyte layer. In the electrode group thus prepared, the liquid nonaqueous electrolyte scarcely oozes onto the surface of the electrode group.

It is desirable for the polymer to have thermoplastic properties. It is also desirable for the polymer to have a function of gelling the liquid nonaqueous electrolyte. It is possible to use as the polymer meeting these requirements at least one of the materials selected from the group consisting of, for example, polyvinylidene fluoride (PVdF), polyacrylonitrile (PAN), polyethylene oxide (PEO), polyvinyl chloride (PVC), polyacrylate (PMMA), and polyvinylidene fluoride-hexafluoro propylene (PVdF-HFP).

In the second nonaqueous electrolyte secondary battery of the present invention, it is possible to use the nonaqueous solvent and the solute equal to those described previously in conjunction with the first nonaqueous electrolyte secondary battery.

In the second nonaqueous electrolyte secondary battery of the present invention, it is desirable to apply an initial charging to the secondary battery with a current falling within a range of between 0.05 C and 0.8 C under temperatures falling within a range of between 15° C. and 80° C. The charging under these conditions may be applied once or a plurality of times. Also, it is possible to store the secondary battery under temperatures falling within a range of between 15° C. and 80° C. for about 1 to 20 hours before the initial charging.

First embodiment of the nonaqueous electrolyte secondary battery of the present invention described above comprises a case having a wall thickness not larger than 0.3 mm, a positive electrode housed in the case, a negative electrode housed in the case, and a nonaqueous electrolyte housed in the case and comprising a nonaqueous solvent and a solute dissolved in the nonaqueous solvent.

The nonaqueous solvent contains ethylene carbonate (EC), γ-butyrolactone (BL), and a third solvent consisting essentially of at least one solvent selected from the group consisting of ethylene sulfite, phenylethylene carbonate, 2-methylfuran, furan, thiophene, catechol carbonate and vinylethylene carbonate. The EC is contained in an amount of 20 to 50% by volume relative to 100% by volume of the total amount of the EC and the BL. The BL is contained in an amount of 40 to 80% by volume relative to 100% by volume of the total amount of the EC and the BL.

It is absolutely necessary for the case to have a wall thickness not larger than 0.3 mm in order to improve the weight energy density and the volume energy density of the nonaqueous electrolyte secondary battery. However, the case having a wall thickness not larger than 0.3 mm gives rise to the problem that the case tends to be swollen by the gas generated within the case.

It should be noted in this connection that, as described above, the mixed solvent comprising ethylene carbonate and γ-butyrolactone contains 40 to 80% by volume of γ-butyrolactone. In this case, it is possible to suppress the reaction between the positive electrode active material and the nonaqueous electrolyte during storage of the secondary battery under a high temperature environment or in the stage of the initial charging so as to prevent the decomposition of the nonaqueous electrolyte by oxidation. As a result, the amount of the gas generation can be suppressed so as to suppress the swelling of the case.

It should also be noted that the mixed solvent comprising ethylene carbonate and γ-butyrolactone contains 20 to 50% by volume of ethylene carbonate, as described above. In addition, a third solvent is contained in the nonaqueous solvent. In this case, it is possible to form a dense protective film on the surface of the negative electrode. As a result, the reaction between the negative electrode and γ-butyrolactone can be suppressed under a high temperature environment so as to suppress the decomposition of the nonaqueous electrolyte by reduction. It follows that it is possible to suppress the elevation of the impedance in the interface of the negative electrode, with the result that it is possible to improve the charge-discharge cycle life of the secondary battery under a high temperature environment.

As described above, it is possible to provide a nonaqueous electrolyte secondary battery capable of improving the weight energy density and the volume energy density, suppressing the gas generation during storage of the secondary battery under high temperatures and in the initial charging stage, and having a long life even under a high temperature environment.

Second embodiment of the nonaqueous electrolyte secondary battery of the present invention comprises a case having a wall thickness not larger than 0.3 mm, a positive electrode housed in the case and capable of absorbing-desorbing lithium ions, a negative electrode housed in the case and capable of absorbing-desorbing lithium ions, a separator arranged between the positive electrode and the negative electrode housed in the case, and a liquid nonaqueous electrolyte impregnated in at least the separator and comprising a nonaqueous solvent and a solute dissolved in the nonaqueous solvent. The nonaqueous solvent contains ethylene carbonate (EC), γ-butyrolactone (BL) and a third solvent. The EC is contained in an amount of 20 to 50% by volume relative to 100% by volume of the total amount of the EC and the BL. The BL is contained in an amount of 40 to 80% by volume relative to 100% by volume of the total amount of the EC and the BL.

A liquid nonaqueous electrolyte is used in the nonaqueous electrolyte secondary battery of the present invention so as to markedly improve the charge-discharge cycle life of the secondary battery under a high temperature environment.

Third embodiment of the nonaqueous electrolyte secondary battery of the present invention comprises a case having a wall thickness not larger than 0.3 mm, a positive electrode housed in the case, a negative electrode housed in the case, and a nonaqueous electrolyte layer housed in the case and containing a nonaqueous electrolyte prepared by dissolving a solute in a nonaqueous solvent. The solvent contains ethylene carbonate and γ-butyrolactone. When a charge-discharge cycle test satisfying conditions (A) to (D) given below is performed under an environment of 45° C., the capacity retention rate at 100-th charge-discharge cycle is at least 85% based on the discharge capacity in the first charge-discharge cycle:

(A) for the charging, the constant current-constant voltage charging to 4.2V is performed for 3 hours under a current of 1 C;

(B) the discharging is performed to 3V under a current of 1 C;

(C) after the charging, the secondary battery is left to stand for 10 minutes, followed by performing the discharging; and (D) after the discharging, the secondary battery is left to stand for 10 minutes, followed by performing the charging.

Incidentally, the expression "1 C" denotes the current value required for the discharge of the nominal capacity (Ah) in one hour.

According to the third embodiment of the nonaqueous electrolyte secondary battery of the present invention described above, it is possible to improve the weight energy density and the volume energy density, and to suppress the gas generation in the initial charging process and during storage of the secondary battery under high temperatures. Also, it is possible for the secondary battery to have a long life even under a high temperature environment.

The third embodiment of the secondary battery described above can be obtained by, for example, using a nonaqueous solvent containing ethylene carbonate (EC), γ-butyrolactone (BL), and a third solvent consisting essentially of at least one solvent selected from the group consisting of ethylene sulfite, phenylethylene carbonate, 2-methylfuran, furan, thiophene, catechol carbonate and vinylethylene carbonate, the EC content falling within a range of 20 to 50% by volume based on the total amount of the EC and the BL, and the BL content falling within a range of 40 to 80% by volume based on the total amount of the EC and the BL.

Examples of the present invention will now be described with reference to the accompanying drawings.

EXAMPLE 1

Preparation of Positive Electrode

In the first step, a slurry was prepared by adding 3% by weight of acetylene black, 3% by weight of graphite and 3% by weight of polyvinylidene fluoride (PVdF) used as a binder together with N-methyl-2-pyrrolidone used as a solvent to 91% by weight of a powdery lithium cobalt oxide ($Li_xCoO_2$, where x is larger than 0 and not larger than 1, i.e., $0<X\leq1$). Then, both surfaces of a current collector formed of an aluminum foil having a thickness of 15 $\mu$m were coated with the resultant slurry, followed by drying and pressing the current collector coated with the slurry so as to prepare a positive electrode having an electrode density of 3 $g/cm^3$ and including the electrode layer consisting essentially of the dried slurry formed on each surface of the current collector.

Preparation of Negative Electrode

Prepared was a slurry by adding 7% by weight of polyvinylidene fluoride (PVdF) used as a binder and N-methyl-2-pyrrolidone used as a solvent to 93% by weight of a powdery mesophase pitch based carbon fiber used as a carbonaceous material and subjected to a heat treatment at 3,000° C., said carbon fiber having a fiber diameter of 8 $\mu$m, an average fiber length of 20 $\mu$m, and an average layer spacing $d_{002}$ derived from (002) reflection of 0.3360 nm. Then, both surfaces of a current collector formed of a copper foil having a thickness of 12 $\mu$m were coated with the resultant slurry, followed by drying and pressing the current collector coated with the slurry so as to obtain a negative electrode having an electrode density of 1.4 $g/cm^3$ and including the negative electrode layers each consisting essentially of the dried slurry supported by the current collector.

Separator

Prepared was a separator formed of a polyethylene porous film having a thickness of 25 $\mu$m, a thermal shrinkage at 120° C. for one hour of 20%, and a porosity of 50%.

Preparation of Liquid Nonaqueous Electrolyte

A mixed solvent was prepared by mixing ethylene carbonate (EC) and γ-butyrolactone (BL) in a mixing ratio (EC:BL) by volume of 33:67. Then, a nonaqueous solvent was prepared by adding 0.5% by weight of ethylene sulfite (ES) to 99.5% by weight of the resultant mixed solvent. Further, lithium tetrafluoro borate ($LiBF_4$) was dissolved in the nonaqueous solvent thus prepared in a concentration of 1.5 mol/L so as to obtain a nonaqueous electrolyte.

Preparation of Electrode Group

A band-like positive electrode lead was welded to the current collector of the positive electrode, and a band-like negative electrode lead was welded to the current collector of the negative electrode. Then, a laminate structure comprising the positive electrode, the negative electrode and the separator interposed between the positive and negative electrodes was spirally wound, followed by forming the wound laminate structure into a flat shape so as to prepare the electrode group.

Further, a press molding was applied to the electrode group for 25 seconds under a pressure of 13 $kg/cm^2$ while heating the electrode group to 90° C. so as to make integral the positive electrode, the negative electrode and the separator.

On the other hand, a laminate film comprising an aluminum foil and polypropylene layers formed on the both surfaces of the aluminum film, said laminate film having a thickness of 100 $\mu$m, was formed into a bag and the electrode group prepared as above was housed in the bag thus formed.

In the next step, a vacuum drying was applied for 12 hours at 80° C. to the electrode group housed in the bag of the laminate film so as to remove the water contained in the electrode group and the laminate film.

Further, the nonaqueous electrolyte was poured into the electrode group housed in the bag of the laminate film in an amount of 4.8 g per 1 Ah of the battery capacity so as to assemble a thin type nonaqueous electrolyte secondary battery constructed as shown in FIGS. 1 and 2 and having a thickness of 3.6 mm, a width of 35 mm, a height of 62 mm, and a design capacity of 520 mAh. The term "design capacity" noted above represents the nominal capacity referred to previously.

The following treatments were applied as the initial charge-discharge process to the nonaqueous electrolyte secondary battery thus assembled. Specifically, the nonaqueous electrolyte secondary battery was left to stand under a high temperature environment of 45° C. for 2 hours, followed by performing a constant current constant voltage charging for 15 hours to 4.2V with a current of 0.2 C (104 mA) under the high temperature environment noted above. Then, the nonaqueous electrolyte secondary battery was left to stand at 20° C. for 7 days. Further, the nonaqueous electrolyte secondary battery was discharged to 3V with a current of 0.2 C under an environment of 20° C. so as to manufacture a nonaqueous electrolyte secondary battery.

EXAMPLES 2 TO 25

Thin type nonaqueous electrolyte secondary batteries were manufactured as in Example 1, except that the compositions of the nonaqueous solvents were changed as shown in Tables 1 to 3.

Comparative Examples 1 to 9

Thin type nonaqueous electrolyte secondary batteries were manufactured as in Example 1, except that the compositions of the nonaqueous solvents and the lithium salt were changed as shown in Table 4.

A charge-discharge cycle test was applied to each of the secondary batteries prepared in Examples 1 to 25 and Comparative Examples 1 to 9 under an environment of 45° C. so as to measure the capacity retention rate after the 100-th cycle and the maximum discharge capacity during the 100 charge-discharge cycles. The results are also shown in Tables 1 to 4. In the charging process included in this charge-discharge cycle test, a constant current charging was performed to 4.2V with a constant current of 1 C (520 mA), followed by performing a constant voltage charging with a constant voltage of 4.2V. The total charging time of the constant current charging and the constant voltage charging was set at 3 hours. In the discharge process, the nonaqueous electrolyte secondary battery was discharged to 3V with a current of 1 C (520 mA). Also, after the charging process, the secondary battery was left to stand for 10 minutes, followed by performing the discharging process. Also, after the discharging process, the secondary battery was left to stand for 10 minutes, followed by performing the charging process. Further, the capacity retention rate after the 100 charge-discharge cycles is represented by the discharge capacity at the 100-th charge-discharge cycle with the discharge capacity for the first charge-discharge cycle set at 100%.

On the other hand, the swelling of the secondary battery caused by the storage of the secondary battery under a high temperature environment and under a charged state was examined in respect of the secondary battery for each of Examples 1 to 25 and Comparative Examples 1 to 9. Specifically, the secondary battery was charged to 4.2V by the charging under a constant current of 1 C under an environment of 20° C., followed by performing a constant voltage charging with a constant voltage of 4.2V. The total charging time of the charging under a constant current and the charging under a constant voltage was set at 3 hours. Then, the secondary battery was left to stand for 120 hours in a constant temperature bath of 85° C., followed by taking the secondary battery out of the constant temperature bath. Further, the secondary battery taken out of the constant temperature bath was left to stand for 2 hours under an environment of 20° C., followed by measuring the swelling of the secondary battery. The results are also shown in Tables 1 to 4.

TABLE 1

|  | Nonaqueous solvent | Solute | Solute concentration (mol/L) | Maximum discharge capacity (Ah) | Capacity retention rate (%) | Swelling (%) |
| --- | --- | --- | --- | --- | --- | --- |
| Example 1 | mixed solvent of EC and BL (volume ratio 33:67) 99.5 wt %, 0.5 wt % ES; | $LiBF_4$ | 1.5 | 0.52 | 95 | 1 |
| Example 2 | mixed solvent of EC and BL (volume ratio 33:67) 99.5 wt %, 0.5 wt % phEC; | $LiBF_4$ | 1.5 | 0.52 | 87 | 1 |
| Example 3 | mixed solvent of EC and BL (volume ratio 33:67) 99.5 wt %, 0.5 wt % 2Me-F; | $LiBF_4$ | 1.5 | 0.52 | 90 | 2 |
| Example 4 | mixed solvent of EC and BL (volume ratio 33:67) 99.5 wt %, 0.5 wt % F; | $LiBF_4$ | 1.5 | 0.52 | 88 | 2 |
| Example 5 | mixed solvent of EC and BL (volume ratio 33:67) 99.5 wt %, 0.5 wt % TIOP; | $LiBF_4$ | 1.5 | 0.52 | 93 | 2 |
| Example 6 | mixed solvent of EC and BL (volume ratio 33:67) 99.5 wt %, 0.5 wt % CATC; | $LiBF_4$ | 1.5 | 0.52 | 92 | 1 |
| Example 7 | mixed solvent of EC and BL (volume ratio 33:67) 99.5 wt %, 0.5 wt % VEC | $LiBF_4$ | 1.5 | 0.52 | 95 | 1 |
| Example 8 | mixed solvent of EC and BL (volume ratio 33:67) 98 wt %, 2 wt % ES; | $LiBF_4$ | 1.5 | 0.50 | 90 | 1 |
| Example 9 | mixed solvent of EC and BL (volume ratio 33:67) 96 wt %, 4 wt % phEC; | $LiBF_4$ | 1.5 | 0.52 | 87 | 1 |
| Example 10 | mixed solvent of EC and BL (volume ratio 33:67) 98 wt %, 2 wt % 2Me-F; | $LiBF_4$ | 1.5 | 0.51 | 90 | 2 |

TABLE 2

|  | Nonaqueous solvent | Solute | Solute concentration (mol/L) | Maximum discharge capacity (Ah) | Capacity retention rate (%) | Swelling (%) |
| --- | --- | --- | --- | --- | --- | --- |
| Example 11 | mixed solvent of EC and BL (volume ratio 33:67) 98 wt %, 2 wt % F; | $LiBF_4$ | 1.5 | 0.50 | 88 | 2 |
| Example 12 | mixed solvent of EC and BL (volume ratio 33:67) 98 wt %, 2 wt % TIOP; | $LiBF_4$ | 1.5 | 0.50 | 93 | 2 |
| Example 13 | mixed solvent of EC and BL (volume ratio 33:67) 98 wt %, 2 wt % CATC; | $LiBF_4$ | 1.5 | 0.50 | 92 | 1 |
| Example 14 | mixed solvent of EC and BL (volume ratio 33:67) 98 wt %, 2 wt % VEC; | $LiBF_4$ | 1.5 | 0.52 | 93 | 1 |
| Example 15 | mixed solvent of EC and BL (volume ratio 33:67) 93 wt %, 7 wt % ES; | $LiBF_4$ | 1.5 | 0.43 | 87 | 2 |
| Example 16 | mixed solvent of EC and BL (volume ratio 33:67) 93 wt %, 7 wt % phEC; | $LiBF_4$ | 1.5 | 0.48 | 90 | 2 |
| Example 17 | mixed solvent of EC and BL (volume ratio 33:67) 93 wt %, 7 wt % 2Me-F; | $LiBF_4$ | 1.5 | 0.45 | 90 | 4 |
| Example 18 | mixed solvent of EC and BL (volume ratio 33:67) 93 wt %, 7 wt % F; | $LiBF_4$ | 1.5 | 0.43 | 88 | 4 |
| Example 19 | mixed solvent of EC and BL (volume ratio 33:67) 93 wt %, 7 wt % TIOP; | $LiBF_4$ | 1.5 | 0.43 | 90 | 4 |
| Example 20 | mixed solvent of EC and BL (volume ratio 33:67) 93 wt %, 7 wt % CATC; | $LiBF_4$ | 1.5 | 0.43 | 91 | 3 |
| Example 21 | mixed solvent of EC and BL (volume ratio 33:67) 93 wt %, 7 wt % VEC; | $LiBF_4$ | 1.5 | 0.48 | 87 | 2 |

TABLE 3

|  | Nonaqueous solvent | Solute | Solute concentration (mol/L) | Maximum discharge capacity (Ah) | Capacity retention rate (%) | Swelling (%) |
|---|---|---|---|---|---|---|
| Example 22 | mixed solvent of EC and BL (volume ratio 40:60) 99.5 wt %, 0.5 wt % ES; | LiBF$_4$ | 1.5 | 0.52 | 93 | 1 |
| Example 23 | mixed solvent of EC and BL (volume ratio 25:75) 99.5 wt %, 0.5 wt % ES; | LiBF$_4$ | 1.5 | 0.52 | 92 | 1 |
| Example 24 | mixed solvent of EC and BL (volume ratio 40:60) 99.5 wt %, 0.5 wt % VEC; | LiBF$_4$ | 1.5 | 0.52 | 94 | 1 |
| Example 25 | mixed solvent of EC and BL (volume ratio 25:75) 99.5 wt %, 0.5 wt % VEC; | LiBF$_4$ | 1.5 | 0.52 | 93 | 1 |

TABLE 4

|  | Nonaqueous solvent | Solute | Solute concentration (mol/L) | Maximum discharge capacity (Ah) | Capacity retention rate (%) | Swelling (%) |
|---|---|---|---|---|---|---|
| Comparative Example 1 | 100 vol. % BL | LiBF$_4$ | 1.5 | 0.30 | 10 | 1 |
| Comparative Example 2 | 25 vol. % EC, 50 vol. % BL, 25 vol. % MEC | LiBF$_4$ | 1.5 | 0.30 | 20 | 100 |
| Comparative Example 3 | 75 vol. % EC, 25 vol. % BL | LiBF$_4$ | 1.5 | 0.40 | 30 | 20 |
| Comparative Example 4 | 1 vol. % EC, 99 vol. % BL | LiBF$_4$ | 1.5 | 0.35 | 10 | 10 |
| Comparative Example 5 | 25 vol. % EC, 75 vol. % MEC | LiPF$_6$ | 1.5 | 0.52 | 0.1 | 50 |
| Comparative Example 6 | 33 vol. % EC, 67 vol. % BL | LiBF$_4$ | 1.5 | 0.52 | 75 | 1 |
| Comparative Example 7 | 40 vol. % EC, 60 vol. % BL | LiBF$_4$ | 1.5 | 0.52 | 75 | 1 |
| Comparative Example 8 | 25 vol. % EC, 75 vol. % BL | LiBF$_4$ | 1.5 | 0.52 | 75 | 1 |
| Comparative Example 9 | 33 vol. % EC, 66 vol. % BL, 1 vol. % VC | LiBF$_4$ | 1.5 | 0.52 | 79 | 2 |

To reiterate, the secondary battery for each of Examples 1 to 25 comprises a liquid nonaqueous electrolyte containing ethylene carbonate (EC), γ-butyrolactone (BL) and the third solvent specified in the present invention. The EC is contained in an amount of 20 to 50% by volume relative to 100% by volume of the total amount of the EC and the BL. The BL is contained in an amount of 40 to 80% by volume relative to 100% by volume of the total amount of the EC and the BL. As apparent from Tables 1 to 4, it was possible to obtain a high discharge capacity for each of the secondary batteries for Examples 1 to 25. In addition, the capacity retention rate at the 100-th charge-discharge cycle of the secondary battery at 45° C. was at least 85%, and it was possible to suppress the swelling during storage of the secondary battery under high temperatures.

On the other hand, the capacity retention rate at the 100-th charge-discharge cycle of the secondary battery at 45° C. was lower than 80% for the secondary batteries for Comparative Examples 1 to 9.

Figure 3:
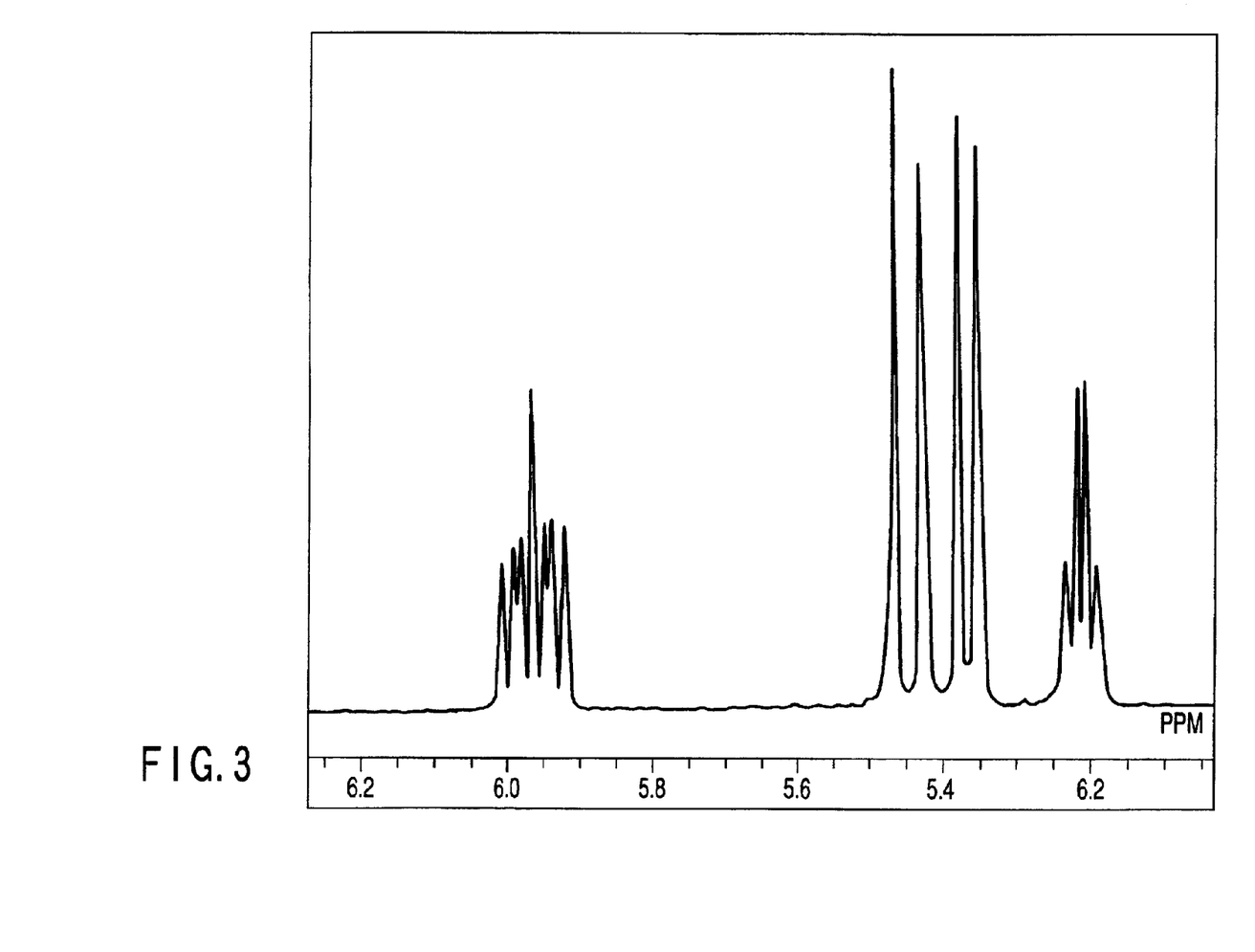
FIG. 3 is a graph showing the characteristics of $^1$HNMR spectrum of the nonaqueous electrolyte used in the thin type nonaqueous electrolyte secondary battery for Example 7 of the present invention.

The secondary battery for Example 7 was subjected to the initial charge-discharge process, followed by leaving the circuit open for at least 5 hours so as to sufficiently stabilize the potential. Then, the secondary battery was dismantled within a glove box having an Ar concentration of at least 99.9% and a dew point of −50° C. or lower so as to take out the electrode group. The electrode group thus taken out was packed in a centrifugal sinking tube. The tube was filled with dimethyl sulfoxide (DMSO)-d$_6$, and the tube was sealed. Further, the tube was taken out of the glove box and subjected to a centrifugal separation. Then, a mixed solvent consisting of the nonaqueous electrolyte and DMSO-d$_6$ was taken out of the centrifugal sinking tube within the glove box. About 0.5 ml of the mixed solvent was put in a sample tube for NMR having a diameter of 5 mm so as to perform the NMR measurement. The apparatus used for the NMR measurement was JNM-LA400 WB manufactured by JEOL, the observation nucleus was $^1$H, the observation frequency was 400 MHz, and the internal standard of dimethyl sulfoxide (DMSO)-d$_5$ (2.5 ppm) was used as the reference substance. Further, the measuring temperature was 25° C. In the $^1$HNMR, a peak derived from EC was observed in the vicinity of 4.5 ppm, and the peaks derived from VEC were observed in the vicinity of 5.2 ppm, 5.4 ppm and 6 ppm. This confirms that VEC was contained in the nonaqueous solvent present in the secondary battery for Example 7 after the initial charge-discharge process. Also, a ratio of the NMR integration intensity for VEC to the NMR integration intensity for EC was obtained. It was found that the ratio of VEC to the entire nonaqueous solvent was lower than that before assembly of the secondary battery. For reference, FIG. 3 shows the $^1$NMR spectrum of the nonaqueous electrolyte used in Example 7.

EXAMPLE 26

A nonaqueous electrolyte secondary battery was prepared as in Example 1, except that the case was prepared by forming an aluminum sheet having a thickness of 0.3 mm into a parallelepiped can having a thickness of 4 mm, a width of 34 mm, and a height of 58 mm.

EXAMPLES 27 TO 32

Thin type nonaqueous electrolyte secondary batteries were prepared as in Example 26, except that the compositions of the nonaqueous solvents were changed as shown in Table 5.

Comparative Examples 10 to 18

Thin type nonaqueous electrolyte secondary batteries were prepared as in Example 26, except that the compositions of the nonaqueous solvents and the lithium salts used were changed as shown in Table 6.

The capacity retention rate after 100 cycles of the charge-discharge operation performed at 45° C. and the maximum discharge capacity in the 100 cycles of the charge discharge operation were measured under the conditions equal to those in Example 1 described previously in respect of the secondary battery for each of Examples 26 to 32 and Comparative Examples 10 to 18. The results are shown in Tables 5 and 6. Also, the swelling of the secondary battery after storage of the secondary battery under the conditions equal to those for Example 1 described previously was measured for each of the secondary batteries prepared in Examples 26 to 32 and Comparative Examples 10 to 18. The results are also shown in Tables 5 and 6.

To reiterate, the secondary battery for each of Examples 26 to 32 comprises a liquid nonaqueous electrolyte containing ethylene carbonate (EC), γ-butyrolactone (BL) and the third solvent specified in the present invention. The EC is contained in an amount of 20 to 50% by volume relative to 100% by volume of the total amount of the EC and the BL. The BL is contained in an amount of 40 to 80% by volume relative to 100% by volume of the total amount of the EC and the BL. As apparent from Tables 5 and 6, it was possible to obtain a high discharge capacity for each of the secondary batteries for Examples 26 to 32. In addition, the capacity retention rate at the 100-th charge-discharge cycle of the secondary battery at 45° C. was at least 85%, and it was possible to suppress the swelling during storage of the secondary battery under high temperatures.

On the other hand, the capacity retention rate at the 100-th charge-discharge cycle of the secondary battery at 45° C. was lower than 80% for the secondary batteries for Comparative Examples 10 to 18.

EXAMPLE 33

Preparation of Nonaqueous Electrolyte

Polyvinylidene fluoride-hexafluoro propylene (PVdF-HFP), which was used as a polymer for gelling a nonaque-

TABLE 5

| | Nonaqueous solvent | Solute | Solute concentration (mol/L) | Maximum discharge capacity (Ah) | Capacity retention rate (%) | Swelling (%) |
|---|---|---|---|---|---|---|
| Example 26 | mixed solvent of EC and BL (volume ratio 33:67) 99.5 wt %, 0.5 wt % ES; | $LiBF_4$ | 1.5 | 0.52 | 93 | 1 |
| Example 27 | mixed solvent of EC and BL (volume ratio 33:67) 99.5 wt %, 0.5 wt % phEC; | $LiBF_4$ | 1.5 | 0.52 | 85 | 1 |
| Example 28 | mixed solvent of EC and BL (volume ratio 33:67) 99.5 wt %, 0.5 wt % 2Me-F; | $LiBF_4$ | 1.5 | 0.52 | 89 | 2 |
| Example 29 | mixed solvent of EC and BL (volume ratio 33:67) 99.5 wt %, 0.5 wt % F; | $LiBF_4$ | 1.5 | 0.52 | 88 | 2 |
| Example 30 | mixed solvent of EC and BL (volume ratio 33:67) 99.5 wt %, 0.5 wt % TIOP; | $LiBF_4$ | 1.5 | 0.52 | 92 | 2 |
| Example 31 | mixed solvent of EC and BL (volume ratio 33:67) 99.5 wt %, 0.5 wt % CATC; | $LiBF_4$ | 1.5 | 0.52 | 92 | 1 |
| Example 32 | mixed solvent of EC and BL (volume ratio 33:67) 99.5 wt %, 0.5 wt % VEC; | $LiBF_4$ | 1.5 | 0.52 | 94 | 1 |

TABLE 6

| | Nonaqueous solvent | Solute | Solute concentration (mol/L) | Maximum discharge capacity (Ah) | Capacity retention rate (%) | Swelling (%) |
|---|---|---|---|---|---|---|
| Comparative Example 10 | 100 vol. % BL | $LiBF_4$ | 1.5 | 0.3 | 10 | 1 |
| Comparative Example 11 | 25 vol. % EC, 50 vol. % BL, 25 vol. % MEC | $LiBF_4$ | 1.5 | 0.3 | 40 | 30 |
| Comparative Example 12 | 75 vol. % EC, 25 vol. % BL | $LiBF_4$ | 1.5 | 0.4 | 30 | 8 |
| Comparative Example 13 | 1 vol. % EC, 99 vol. % BL | $LiBF_4$ | 1.5 | 0.35 | 10 | 6 |
| Comparative Example 14 | 25 vol. % EC, 75 vol. % MEC | $LiPF_6$ | 1.5 | 0.52 | 30 | 9 |
| Comparative Example 15 | 33 vol. % EC, 67 vol. % BL | $LiBF_4$ | 1.5 | 0.52 | 75 | 1 |
| Comparative Example 16 | 40 vol. % EC, 60 vol. % BL | $LiBF_4$ | 1.5 | 0.52 | 74 | 2 |
| Comparative Example 17 | 25 vol. % EC, 75 vol. % BL | $LiBF_4$ | 1.5 | 0.52 | 75 | 2 |
| Comparative Example 18 | 33 vol. % EC, 66 vol. % BL, 1 vol. % VC | $LiBF_4$ | 1.5 | 0.52 | 78 | 1 | ous electrolyte, was dissolved in tetrahydrofuran (THF) so as to obtain a solution. A paste was prepared by mixing the solution with a nonaqueous electrolyte equal to that used in Example 1. Then, a substrate was coated with the paste thus prepared, followed by drying the substrate coated with the paste so as to obtain a thin film.

Preparation of Electrode Group

A band-like positive electrode lead was welded to the current collector of the positive electrode similar to that used in Example 1, and a band-like negative electrode lead was welded to the current collector of the negative electrode similar to that used in Example 1. Then, a laminate structure comprising the positive electrode, the negative electrode and the thin film noted above interposed between the positive and negative electrodes was spirally wound, followed by forming the wound laminate structure into a flat shape so as to prepare the electrode group.

The electrode group thus prepared was dipped in a nonaqueous electrolyte similar to that used Example 1, followed by plasticizing the thin film under a reduced pressure so as to obtain an electrode group having the nonaqueous electrolyte layer interposed between the positive electrode and the negative electrode.

On the other hand, a laminate film comprising an aluminum foil and polypropylene layers formed on the both surfaces of the aluminum foil, said laminate film having a thickness of 100 $\mu$m, was formed into a bag and the electrode group prepared as above was housed in the bag thus formed so as to assemble a thin type nonaqueous electrolyte secondary battery having a thickness of 3.6 mm, a width of 35 mm, a height of 62 mm, and a design capacity of 420 mAh. The term "design capacity" noted above denotes the nominal capacity referred to previously.

The following treatments were applied as the initial charge-discharge process to the nonaqueous electrolyte secondary battery thus assembled. Specifically, the nonaqueous electrolyte secondary battery was left to stand under a high temperature environment of 45° C. for 2 hours, followed by performing a constant current constant voltage charging for 15 hours to 4.2V with a current of 0.2 C (84 mA) under the high temperature environment noted above. Then, the nonaqueous electrolyte secondary battery was left to stand at 20° C. for 7 days. Further, the nonaqueous electrolyte secondary battery was discharged to 3V with a current of 0.2 C under an environment of 20° C. so as to manufacture a nonaqueous electrolyte secondary battery.

EXAMPLES 34 TO 39

Thin type nonaqueous electrolyte secondary batteries were prepared as in Example 33, except that the compositions of the nonaqueous solvents were changed as shown in Table 7.

Comparative Examples 19 to 27

Thin type nonaqueous electrolyte secondary batteries were prepared as in Example 33, except that the compositions of the nonaqueous solvents and the lithium salts used were changed as shown in Table 8.

The capacity retention rate after 100 cycles of the charge-discharge operation performed at 45° C. and the maximum discharge capacity in the 100 cycles of the charge discharge operation were measured under the conditions equal to those in Example 1 described previously in respect of the secondary battery, except that the current 1 C set at 420 mA, for each of Examples 33 to 39 and Comparative Examples 19 to 27. The results are shown in Tables 7 and 8. Also, the swelling of the secondary battery after storage of the secondary battery under the conditions equal to those for Example 1 described previously was measured for each of the secondary batteries prepared in Examples 33 to 39 and Comparative Examples 19 to 27. The results are also shown in Tables 7 and 8.

TABLE 7

| | Nonaqueous solvent | Solute | Solute concentration (mol/L) | Maximum discharge capacity (Ah) | Capacity retention rate (%) | Swelling (%) |
|---|---|---|---|---|---|---|
| Example 33 | mixed solvent of EC and BL (volume ratio 33:67) 99.5 wt %, 0.5 wt % ES; | $LiBF_4$ | 1.5 | 0.42 | 93 | 1 |
| Example 34 | mixed solvent of EC and BL (volume ratio 33:67) 99.5 wt %, 0.5 wt % phEC; | $LiBF_4$ | 1.5 | 0.42 | 85 | 1 |
| Example 35 | mixed solvent of EC and BL (volume ratio 33:67) 99.5 wt %, 0.5 wt % 2Me-F; | $LiBF_4$ | 1.5 | 0.42 | 88 | 2 |
| Example 36 | mixed solvent of EC and BL (volume ratio 33:67) 99.5 wt %, 0.5 wt % F; | $LiBF_4$ | 1.5 | 0.42 | 86 | 2 |
| Example 37 | mixed solvent of EC and BL (volume ratio 33:67) 99.5 wt %, 0.5 wt % TIOP; | $LiBF_4$ | 1.5 | 0.42 | 90 | 2 |
| Example 38 | mixed solvent of EC and BL (volume ratio 33:67) 99.5 wt %, 0.5 wt % CATC; | $LiBF_4$ | 1.5 | 0.42 | 90 | 1 |
| Example 39 | mixed solvent of EC and BL (volume ratio 33:67) 99.5 wt %, 0.5 wt % VEC; | $LiBF_4$ | 1.5 | 0.42 | 93 | 1 |

TABLE 8

| | Nonaqueous solvent | Solute | Solute concentration (mol/L) | Maximum discharge capacity (Ah) | Capacity retention rate (%) | Swelling (%) |
|---|---|---|---|---|---|---|
| Comparative Example 19 | 100 vol. % BL | LiBF$_4$ | 1.5 | 0.2 | 10 | 1 |
| Comparative Example 20 | 25 vol. % EC, 50 vol. % BL, 25 vol. % MEC | LiBF$_4$ | 1.5 | 0.2 | 30 | 30 |
| Comparative Example 21 | 75 vol. % EC, 25 vol. % BL | LiBF$_4$ | 1.5 | 0.3 | 15 | 8 |
| Comparative Example 22 | 1 vol. % EC, 99 vol. % BL | LiBF$_4$ | 1.5 | 0.42 | 10 | 6 |
| Comparative Example 23 | 25 vol. % EC, 75 vol. % MEC | LiPF$_6$ | 1.5 | 0.42 | 27 | 11 |
| Comparative Example 24 | 33 vol. % EC, 67 vol. % BL | LiBF$_4$ | 1.5 | 0.42 | 70 | 3 |
| Comparative Example 25 | 40 vol. % EC, 60 vol. % BL | LiBF$_4$ | 1.5 | 0.42 | 68 | 1 |
| Comparative Example 26 | 25 vol. % EC, 75 vol. % BL | LiBF$_4$ | 1.5 | 0.4 | 68 | 5 |
| Comparative Example 27 | 33 vol. % EC, 66 vol. % BL, 1 vol. % VC | LiBF$_4$ | 1.5 | 0.42 | 75 | 1 |

To reiterate, the secondary battery for each of Examples 33 to 39 comprises a liquid nonaqueous electrolyte containing ethylene carbonate (EC), γ-butyrolactone (BL) and the third solvent specified in the present invention. The EC is contained in an amount of 20 to 50% by volume relative to 100% by volume of the total amount of the EC and the BL. The BL is contained in an amount of 40 to 80% by volume relative to 100% by volume of the total amount of the EC and the BL. As apparent from Tables 7 and 8, it was possible to obtain a high discharge capacity for each of the secondary batteries for Examples 33 to 39. In addition, the capacity retention rate at the 100-th charge-discharge cycle of the secondary battery at 45° C. was at least 85%, and it was possible to suppress the swelling during storage of the secondary battery under high temperatures.

On the other hand, the capacity retention rate at the 100-th charge-discharge cycle of the secondary battery at 45° C. after 100 charge-discharge cycles and the maximum discharge capacity in the 100 charge-discharge cycles. Table 9 shows the results. In the charging process included in this charge-discharge cycle test, a constant current charging was performed to 4.2V with a current of 1 C (520 mA), followed by performing a constant voltage charging with 4.2V. The total charging time of the constant current charging and the constant voltage charging was set at 3 hours. In the discharge process, the nonaqueous electrolyte secondary battery was discharged to 3V with a current of 1 C (520 mA). Also, the capacity retention rate after the 100 charge-discharge cycles is represented by the discharge capacity at the 100-th charge-discharge cycle with the discharge capacity for the first charge-discharge cycle set at 100%.

TABLE 9

| | Nonaqueous solvent | Solute | Solute concentration (mol/L) | Maximum discharge capacity (Ah) | Capacity retention rate after 400 cycles (20° C.) (%) |
|---|---|---|---|---|---|
| Example 1 | mixed solvent of EC and BL (volume ratio 33:67) 99.5 wt %, 0.5 wt % ES; | LiBF$_4$ | 1.5 | 0.52 | 79 |
| Example 2 | mixed solvent of EC and BL (volume ratio 33:67) 99.5 wt %, 0.5 wt % phEC; | LiBF$_4$ | 1.5 | 0.52 | 78 |
| Example 3 | mixed solvent of EC and BL (volume ratio 33:67) 99.5 wt %, 0.5 wt % 2Me-F; | LiBF$_4$ | 1.5 | 0.52 | 62 |
| Example 4 | mixed solvent of EC and BL (volume ratio 33:67) 99.5 wt %, 0.5 wt % F; | LiBF$_4$ | 1.5 | 0.52 | 60 |
| Example 5 | mixed solvent of EC and BL (volume ratio 33:67) 99.5 wt %, 0.5 wt % TIOP; | LiBF$_4$ | 1.5 | 0.52 | 64 |
| Example 6 | mixed solvent of EC and BL (volume ratio 33:67) 99.5 wt %, 0.5 wt % CATC; | LiBF$_4$ | 1.5 | 0.52 | 73 |
| Example 7 | mixed solvent of EC and BL (volume ratio 33:67) 99.5 wt %, 0.5 wt % VEC; | LiBF$_4$ | 1.5 | 0.52 | 71 | was lower than 80% for the secondary batteries for Comparative Examples 19 to 26.

The charge-discharge cycle was repeated under an environment of 20° C. for each of the secondary batteries for Examples 1 to 7 so as to measure the capacity retention rate As apparent from Table 9, the secondary batteries for Examples 1, 2, 6 and 7 using the solvent selected from the group consisting of ES, phES, CATC and VEC were longer in the charge-discharge cycle life under room temperature than that for the secondary batteries for Examples 3 to 5.

EXAMPLE 40

Preparation of Liquid Nonaqueous Electrolyte

A mixed solvent was prepared by mixing ethylene carbonate (EC) and γ-butyrolactone (BL) at a volume ratio (EC:BL) of 33:67. A nonaqueous solvent was obtained by mixing 99.5% by weight of the resultant mixed solvent and 0.5% by weight of ethylene sulfite (ES). Further, a liquid nonaqueous electrolyte was prepared by dissolving in the resultant nonaqueous solvent a first solute of lithium tetrafluoro borate ($LiBF_4$) in a concentration of 1.5 mol/L and a second solute of $LiN(C_2F_5SO_2)_2$ in a concentration of 0.2 mol/L.

A thin type nonaqueous electrolyte secondary battery was prepared as in Example 1, except that used was the nonaqueous electrolyte prepared as above.

EXAMPLES 41 TO 46

Thin type nonaqueous electrolyte secondary batteries were prepared as in Example 40, except that used were the nonaqueous solvents of the compositions shown in Table 10.

The charge retention rate after the 100 charge-discharge cycles at 45° C. and the maximum discharge capacity in the 100 charge-discharge cycles were measured in respect of the secondary battery for each of Examples 40 to 46 under the conditions similar to those described previously in conjunction with Example 1. The results are shown in Table 10. Also measured was the swelling of the secondary battery after the storage under the conditions equal to those described previously in conjunction with Example 1. Table 10 also shows the results.

As apparent from the comparison between the results for Examples 1 to 7 shown in Table 1 and the results for Examples 40 to 46 shown in Table 10, the capacity retention rate after 100 charge-discharge cycles under a high temperature of 45° C. can be improved in the case of using a mixed salt of $LiBF_4$ and $LiN(C_2F_5SO_2)_2$ as a solute, compared with the case of using $LiBF_4$ alone as the solute.

Incidentally, a single solvent was used as the third solvent in the secondary battery for each of Examples 1 to 46. However, even if a plurality of solvents are used as the third solvent, it is possible to improve the charge-discharge cycle life of the secondary battery under high temperatures while suppressing the swelling of the case of the secondary battery during storage of the secondary battery under high temperatures.

As described above in detail, the present invention provides a nonaqueous electrolyte and a nonaqueous electrolyte secondary battery capable of improving the charge-discharge cycle life even under a high temperature environment.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte, comprising:
   a nonaqueous solvent containing ethylene carbonate (EC), γ-butyrolactone (BL), and at least one selected from the group consisting of ethylene sulfite, phenylethylene

TABLE 10

| | Nonaqueous solvent | First solute | First solute concentration (mol/L) | Second solute | Second solute concentration (mol/L) | Maximum discharge capacity (Ah) | Capacity retention rate (%) | Swelling (%) |
|---|---|---|---|---|---|---|---|---|
| Example 40 | mixed solvent of EC and BL (volume ratio 33:67) 99.5 wt %, 0.5 wt % ES; | $LiBF_4$ | 1.5 | $LiN(C_2F_5SO_2)_2$ | 0.2 | 0.52 | 96 | 1 |
| Example 41 | mixed solvent of EC and BL (volume ratio 33:67) 99.5 wt %, 0.5 wt % phEC; | $LiBF_4$ | 1.5 | $LiN(C_2F_5SO_2)_2$ | 0.2 | 0.52 | 89 | 1 |
| Example 42 | mixed solvent of EC and BL (volume ratio 33:67) 99.5 wt %, 0.5 wt % 2Me-F; | $LiBF_4$ | 1.5 | $LiN(C_2F_5SO_2)_2$ | 0.2 | 0.52 | 91 | 2 |
| Example 43 | mixed solvent of EC and BL (volume ratio 33:67) 99.5 wt %, 0.5 wt % F; | $LiBF_4$ | 1.5 | $LiN(C_2F_5SO_2)_2$ | 0.2 | 0.52 | 90 | 2 |
| Example 44 | mixed solvent of EC and BL (volume ratio 33:67) 99.5 wt %, 0.5 wt % TIOP; | $LiBF_4$ | 1.5 | $LiN(C_2F_5SO_2)_2$ | 0.2 | 0.52 | 94 | 2 |
| Example 45 | mixed solvent of EC and BL (volume ratio 33:67) 99.5 wt %, 0.5 wt % CATC; | $LiBF_4$ | 1.5 | $LiN(C_2F_5SO_2)_2$ | 0.2 | 0.52 | 95 | 1 |
| Example 46 | mixed solvent of EC and BL (volume ratio 33:67) 99.5 wt %, 0.5 wt % VEC; | $LiBF_4$ | 1.5 | $LiN(C_2F_5SO_2)_2$ | 0.2 | 0.52 | 96 | 1 | carbonate, catechol carbonate and vinylethylene carbonate as a third solvent, the EC content falling a range of 20 to 50 % by volume based on the total amount of the EC and the BL, and the BL content falling within a range of 40 to 80% by volume based on the total amount of the EC and the BL; and a solute dissolved in said nonaqueous solvent.

2. A nonaqueous electrolyte secondary battery, comprising:

a case having a wall thickness not larger than 0.3 mm;

a positive electrode provided in said case;

a negative electrode provided in said case; and a nonaqueous electrolyte provided in said case and comprising a nonaqueous solvent and a solute dissolved in said nonaqueous solvent, the nonaqueous solvent containing ethylene carbonate (EC) and γ-butyrolactone (BL) and at least one selected from the group consisting of ethylene sulfite, phenylethylene carbonate, 2-methylfuran, furan, thiophene, catechol carbonate, and vinylethylene carbonate, as a third solvent, wherein, when a charge-discharge cycle test satisfying conditions (A) to (D) given below is performed under an environment of 45° C., the capacity retention rate at 100-th charge-discharge cycle is at least 85% based on the discharge capacity in the first charge-discharge cycle:

(A) for the charging, the constant current-constant voltage charging to 4.2V is performed for 3 hours under a current of 1C;

(B) the discharging is performed to 3V under a current of 1C;

(C) after the charging, the secondary battery is left to stand for 10 minutes, followed by performing the discharging; and (D) after the discharging, the secondary battery is left to stand for 10 minutes, followed by performing the charging.

3. The nonaqueous electrolyte secondary battery according to claim 2, wherein said EC is contained in an amount of 20 to 50% by volume based on the total amount of said EC and said BL, and said BL is contained in an amount of 40 to 80% by volume based on the total amount of said EC and said BL.

4. A nonaqueous electrolyte secondary battery, comprising:

a case having a wall thickness not larger than 0.3 mm;

a positive electrode provided in said case;

a negative electrode provided in said case; and a nonaqueous electrolyte which is provided in said case and comprises a nonaqueous solvent and a solute dissolved in said nonaqueous solvent, said nonaqueous solvent containing ethylene carbonate (EC), γ-butyrolactone (BL), and at least one selected from the group consisting of ethylene sulfite, phenylethylene carbonate, catechol carbonate and vinylethylene carbonate as a third solvent, the EC content falling withing a range of 20 to 50% by volume based on the total amount of the EC and the BL, and the BL content falling within a range of 40 to 80% by volume based on the total amount of the EC and the BL.

5. The nonaqueous electrolyte secondary battery according to claim 4, wherein said nonaqueous electrolyte is substantially in the form of a liquid or a gel.

6. The nonaqueous electrolyte secondary battery according to claim 4, wherein said third solvent is contained in an amount of 5% by weight or less based on the total amount of said nonaqueous solvent.

7. The nonaqueous electrolyte secondary battery according to claim 4, wherein, when said third solvent is formed of at least one selected from the group consisting of phenylethylene carbonate, catechol carbonate and vinylethylene carbonate, the mixing amount of said at third solvent is not larger in not large than 3% by weight based on the total amount of said nonaqueous solvent.

8. The nonaqueous electrolyte secondary battery according to claim 4, wherein, when said third solvent is formed of catechol carbonate, the mixing amount of said third solvent is not larger than 1.5% by weight based on the total amount of nonaqueous solvent.

9. The nonaqueous electrolyte secondary battery according to claim 4, wherein, when ethylene sulfite is used as said third solvent, the mixing amount of said solvent is not larger than 2% by weight based on the total amount of said nonaqueous solvent.

10. The nonaqueous electrolyte secondary battery according to claim 4, wherein said third solvent is formed of at least one solvent selected from the group consisting of ethylene sulfite, phenylethylene carbonate, catechol carbonate and vinylethylene carbonate.

11. The nonaqueous electrolyte secondary battery according to claim 4, wherein said solute includes at least one lithium salt selected from the group consisting of $LiClO_4$, $LiPF_6$, $LiBF_4$, $LiAsF_6$, $LiCF_3SO_3$, $LiN(CF_3SO_2)_2$ and $LiN(C_2F_5SO_2)_2$.

12. The nonaqueous electrolyte secondary battery according to claim 4, wherein said negative electrode contains a carbonaceous material capable of absorbing-desorbing lithium ions.

13. The nonaqueous electrolyte secondary battery according to claim 12, wherein said carbonaceous material includes mesophase pitch based carbon fiber.

14. The nonaqueous electrolyte secondary battery according to claim 4, wherein said case is formed essentially of a metal plate, a metal film or a sheet including a resin layer.

15. A nonaqueous electrolyte secondary battery, comprising:

a case having a wall thickness not larger than 0.3 mm;

a positive electrode provided in said case;

a negative electrode provided in said case; and a nonaqueous electrolyte layer which is arranged between said positive electrode and said negative electrode and comprises a nonaqueous electrolyte and a polymer for gelling said nonaqueous electrolyte, said nonaqueous electrolyte comprising a nonaqueous solvent containing ethylene carbonate (EC), γ-butyrolactone (BL), and at least one selected from the group consisting of ethylene sulfite, phenylethylene carbonate, catechol carbonate and vinylethylene carbonate, as a third the EC content falling within a range of 20 to 50% by volume based on the total amount of the EC and the BL, and the BL content falling within a range of 40 to 80% by volume based on the total amount of the EC and the BL.

16. The nonaqueous electrolyte secondary battery according to claim 15, wherein the mixing amount of said third solvent is not larger than 5% by weight based on the total amount of said nonaqueous solvent.

17. The nonaqueous electrolyte secondary battery according to claim 15, wherein, when said third solvent is formed of at least one solvent selected from the group consisting of phenylethylene carbonate, catechol carbonate and vinylethylene carbonate, the mixing amount of said at least one third solvent is not larger than 3% by weight based on the total amount of said nonaqueous solvent.

18. The nonaqueous electrolyte secondary battery according to claim 15, wherein, when third solvent is catechol carbonate, the mixing amount of said at least one third solvent is not larger than 1.5% by weight based on the total amount of said nonaqueous solvent.

19. The nonaqueous electrolyte secondary battery according to claim 15, wherein, when ethylene sulfite is used as said third solvent, the mixing amount of said third solvent is not larger than 2% by weight based on the total amount of said nonaqueous solvent.

20. The nonaqueous electrolyte secondary battery according to claim 15, wherein said third solvent is formed of at least one solvent selected from the group consisting of ethylene sulfite, catechol carbonate, vinylethylene carbonate and phenylethylene carbonate.

21. The nonaqueous secondary battery according to claim 4, wherein the content of said third solvent in the nonaqueous solvent falls withing the range of 0.01% by weight to 5% by weight.

22. The nonaqueous electrolyte according to claim 1, wherein the content of said third solvent nonaqueous solvent is not more than 5% by weight.

23. The nonaqueous electrolyte according to claim 1, wherein the content of said solvent in the nonaqueous solvent falls within the range of 0.01% by weight to 5% by weight.

* * * * *